May 6, 1930.  R. R. SEARLES  1,757,747
SPRING SHACKLE
Filed June 9, 1928
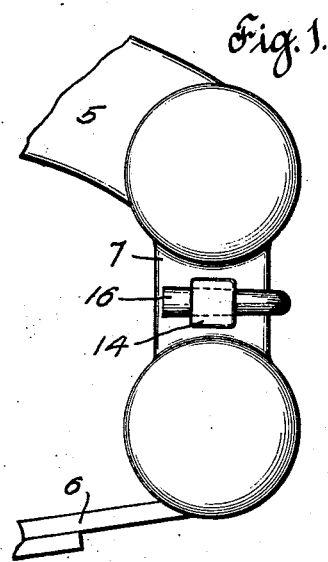
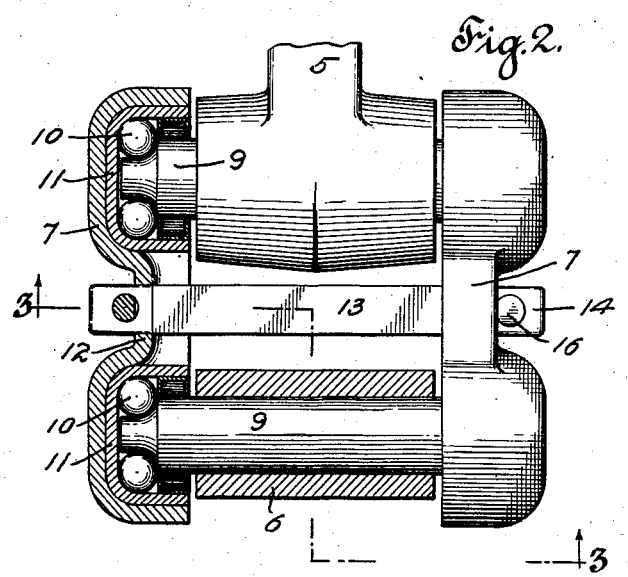
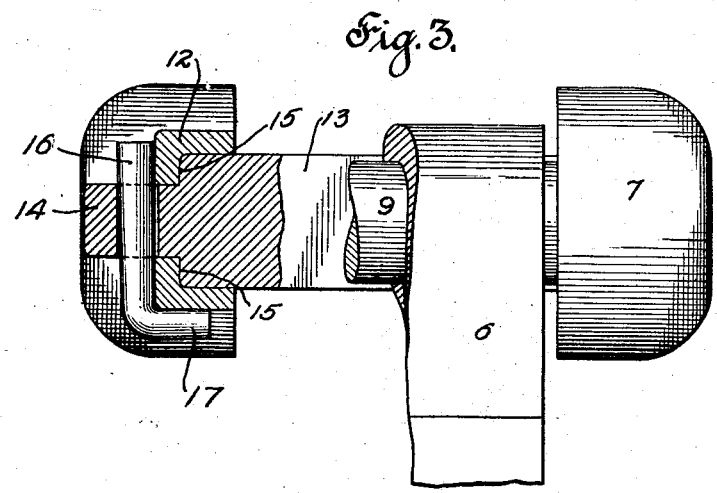
INVENTOR.
Raymond R. Searles
BY
Mitchell Bechtut
ATTORNEYS.

Patented May 6, 1930

1,757,747

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING SHACKLE

Application filed June 9, 1928. Serial No. 284,259.

My invention relates to an antifriction spring shackle construction adapted particularly for connecting an automobile spring and frame.

Antifriction spring shackles are now on the market, and briefly stated, include shackle links having antifriction bearing member raceways at opposite ends of the links. Members having antifriction raceways thereon are secured to the spring and frame, and antifriction bearing members are seated upon the raceways on the shackle links and those on the spring and frame.

The shackle links are usually held together by means of a through-bolt extending through the links and provided with nuts at the ends. A spacing sleeve or thimble surrounds the through-bolt and abuts the insides of the links, so as to act as a spacer for the links. The employment of a tubular sleeve or thimble as a spacer and a through-bolt extending through said thimble as a tie means, requires that there be considerable length to the shackle links in order to accommodate the relatively large diameter of spacing thimble.

It is a principal object of the present invention to provide a single spacing and connecting means for the shackle links of an antifriction spring shackle which will be compact in construction whereby the shackle links may be substantially shorter than usually have been heretofore employed, that is to say, the bearing centers on the spring and frame may be relatively closer together.

It is a more specific object to provide a single spacing and tie-bar for an antifriction shackle construction with improved means for tying the links together and maintaining the same in definite spaced relation.

Briefly stated, in the preferred form of the invention, I employ a pair of shackle links for connecting a spring and frame through the medium of antifriction bearing members interposed between the shackle links and the spring and frame of a vehicle. The shackle links are spaced apart by shoulders upon a combined spacing and tie-bar interposed between the links. One or both ends of the spacing and tie-bar are positively secured to the adjacent shackle link by means such as a wedge key or keys, so that the links will be definitely spaced apart by the shoulders on the spacing and tie-bar and will be definitely held together by the same spacing and tie-bar.

In the drawing, I have shown for illustrative purposes only, a preferred form of the invention.

In said drawing—

Fig. 1 is a fragmentary side view of an automobile frame and spring connected by means of a shackle illustrative of my invention;

Fig. 2 is an end view in partial section of the construction shown in Fig. 1;

Fig. 3 is an enlarged sectional view taken substantially in the plane of the line 3—3, Fig. 2.

In said drawing, 5 indicates the end of an automobile frame, while 6 indicates a spring, the ends of these two members being connected by means of shackle links 7—7. In the form shown the frame is provided with a shackle pin 9 projecting laterally therefrom and forming a race for antifriction bearing members such as balls 10 interposed between the ends of the pin 9 and a bearing cup 11 on the shackle links 7—7. The spring 6 may be provided with a similar pin 9 which serves the same purpose as that heretofore described in connection with the frame end. It is to be understood that both links 7 are preferably the same, and only one link need be described, and its operative connection to the frame and spring illustrated.

Heretofore links such as 7—7 have usually been connected by means of a single through-bolt extending through the sides of the links and provided with nuts at the ends. A spacing thimble or sleeve surrounding the through-bolt usually abuts the inside surfaces of the links, so as to definitely space the latter apart and in just the right position to maintain the proper adjustment on the antifriction bearing members.

My present invention in part relates to an improved means of securing the links together definitely in definite spaced apart relation, and accomplishing this in such a manner that the shackle links may be substantially shorter than has been heretofore practicable when employing a single through-bolt and a spacer thimble or sleeve.

In the particular form of shackle link shown the intermediate portion is of substantially channel shape as indicated at 12. In order to space the links apart, I employ a spacing and tie-bar member 13 which may be, and preferably is, of flat bar shape with its smaller dimension extending between the frame and spring ends so as to conserve space and permit a short link construction. The bar 13 may have a contracted end portion 14 leaving substantial shoulders 15—15 inwardly of the end. The width of the bar 13 as shown particularly in Fig. 3 preferably fills the inside of the channel shaped portion 12 of the link, and the shoulders 15—15 abut the walls of the links between the channel flanges of the link. A relatively contracted end portion 14 of the spacing and tie-bar 13 may extend through a suitable aperture in the link 7. As shown, outside of the link 7 the projecting end 14 on the bar 13 is apertured transversely to receive a tapered wedge key 16. This wedge key may be relatively flat at one side where it engages the outside of the shackle link 7. The shape of the key, however, is ordinarily of small moment.

When the key 16 is driven up tight it will be observed that the shoulders 15—15 will be drawn tightly against the inside of the link 7, and the two links 7—7, assuming that both are held to the bar 13 by the means heretofore described, will be definitely spaced apart by the shouldered portions 15—15 at opposite sides of the bar 13. The end 17 of the wedge key may be bent over the side of the link 7 so as to maintain the key in position and form a positive lock for holding the links together in definitely spaced apart relation.

While I have shown the same means of connection of each link to the spacing and tie-bar 13, it is to be observed that any other desired method of connection may be employed at one end of the spacing and tie-bar 13, and the construction heretofore described may be employed at the opposite end. The spacing and tie-bar 13 is preferably made of relatively flat wide construction for the purpose of conserving space as heretofore described, but it is to be understood that other shapes may be employed. It will also be clear that the projecting end 14 need not be of angular cross section, but could be round.

While I have described the invention in considerable detail, it is to be understood that changes and variations may be made within the scope of the invention as defined in the appended claims.

I claim:

1. An antifriction spring shackle construction including shackle links, antifriction bearing means for connecting an automobile frame and spring through said links, a spacing and tie-bar for spacing and connecting said links, said spacing and tie-bar having a shouldered portion for spacing said links apart, said links having openings therethrough and said spacing and tie-bar having ends projecting through said openings, said projecting ends on said spacing and tie-bar having transverse openings therein and wedge keys extending through said openings for drawing said links together on the shoulders of said spacing and tie-bar, said wedge keys being bent over the sides of said links for holding the same in place and forming a positive lock.

2. An antifriction shackle construction including a pair of shackle links to connect a spring and frame, antifriction bearing members interposed between said links and said spring and frame, a spacing and tie-bar member for spacing and holding said links, shouldered portions on said bar to abut the inside of said links, projecting means on said bar and wedge keys engaging the outside of said links and passing through apertures in said spacing bar for holding said links together in spaced apart relation by said shoulders.

3. In an antifriction shackle construction, a pair of shackle links for connecting a spring and frame to each other, a spacing and tie-bar for spacing and connecting said links, and wedge key means engaging one of said links and said spacing and tie-bar to rigidly secure the latter to said link, and means for holding said other link to said spacing and tie-bar.

4. In an antifriction shackle construction, a pair of shackle links for connecting a spring and frame to each other, said links having channel shaped portions intermediate their ends, a spacing and tie-bar extending between said links and having shouldered portions positioned within said channel shaped portions, and wedge key means for drawing said links together and holding the same in spaced relation against the shouldered portions on said spacing and tie-bar.

5. In an antifriction shackle construction, a pair of shackle links to connect an automobile spring and frame, antifriction bearing members interposed between said spring and frame and said links, a relatively wide flat spacing and tie-bar between the ends of said frame and spring for spacing said links apart, and means for securing said links to said tie-bar for holding said links together in definitely spaced apart relation.

RAYMOND R. SEARLES.